Patented June 24, 1941

2,247,192

UNITED STATES PATENT OFFICE 2,247,192

METHOD OF PREPARING FLUORESCENT MATERIAL

Gorton R. Fonda, Schenectady, N. Y., assignor to General Electric Company, a corporation of New York No Drawing. Application October 28, 1939, Serial No. 301,811

5 Claims. (Cl. 250—81)

The present invention constitutes an improvement in the thermo-synthesis of fluorescent material or phosphor, and, in particular, the preparation of a zinc silicate phosphor which is emissive of yellow light under the influence of ultraviolet radiations.

The best known zinc silicate phosphor fluoresces green when subjected to ultraviolet radiation. Disregarding activating ingredients, it consists of the crystalline orthosilicate, $Zn_2SiO_4$, and may be prepared from two mols of ZnO and one mol of silica. Actually, the orthosilicate is the only known silicate of zinc, and wherever it constitutes, in a crystalline phase, the main part of a phosphor, green fluorescence results. Even when the proportions depart from these orthosilicate proportions, the green fluorescent orthosilicate is formed under conditions leading to formation of a crystallized product and whatever excess of either ingredient may be present does not alter the identity of the orthosilicate. The green fluorescent zinc silicate ordinarily is prepared by firing zinc oxide, silica and a manganese activator at 1000° C., or higher temperatures.

Under special conditions, a reaction involving these ingredients does not result in crystallized zinc orthosilicate, but an amorphous complex of zinc oxide and silica is formed which emits yellow fluorescent light and will be referred to briefly as the yellow zinc silicate. One of the conditions favorable to the formation of the yellow silicate is a lower temperature of thermosynthesis, ordinarily about 850° C. Another condition favorable to the formation of the yellow silicate is an excess of silica which prevents formation of the crystalline orthosilicate.

I have discovered that the synthesis of the yellow zinc silicate phosphor can be improved both in respect to the rapidity of the thermo-synthesis reaction and the luminous efficiency of the final product by carrying out the reaction in the presence of an accelerator consisting of a metallic halide. Another feature of my invention consists in employing other neutral crystallization-retarding reagents in place of the excess of silica.

In carrying out my invention the ratio of zinc oxide and silicate may be either: (1) in the same proportions as heretofore used for the preparation of the yellow phosphor, that is, with the silica in excess of the orthosilicate proportions; or (2) with the silica in lower proportion, even in that corresponding to the composition of the orthosilicate, and substituting an inactive or neutral material such, for example, as alumina, $Al_2O_3$, or magnesia MgO, in place of excess silica. It is even possible to employ an excess of zinc reactant. The essential requirement appears to be that there should be present a material which remains unreacted when the reaction is terminated, and which prevents crystal growth.

In an example of a reaction embodying my invention, a mixture is prepared of precipitated zinc oxide and a suitable form of silica. The latter may consist either of precipitated silica or ground quartz. As already indicated in connection with condition (1), the silica may be in excess. The proportion of silica may be in the range of two to four molecular proportions of silica to one molecular proportion of zinc oxide. In accordance with condition (2), other suitable non-reactive oxide may be substituted for the excess silica, or part of the excess silica. For example, I may employ the zinc oxide and silica in orthosilicate proportions, together with one molecular proportion of alumina or magnesia.

An activator of manganese also is added. The optimum concentration of the element manganese lies in the range of 0.4 to 1.25 per cent, although the yellow fluorescence may be obtained with some sacrifice of brightness outside this range.

As the main feature of my invention, there is added to the reacting ingredients a flux consisting of a halogen compound of a metal, and preferably a chloride, such as potassium chloride, in substantial amounts, and ordinarily within the limits of about 0.5 to 40 per cent by weight. I prefer a concentration of about 15 per cent.

Some of the benefits of an accelerator consisting of a metallic halide can be obtained by employing the activator, commonly manganese, as the chloride instead of the more usual nitrate or oxide. In the same way, the halogen flux may consist of zinc chloride or cadmium chloride. However, in order to obtain the full benefits of my invention, chloride and fluoride compounds of alkali and alkaline earth metals are employed as accelerators. While the most effective accelerator is potassium chloride; sodium chloride, calcium chloride and potassium fluoride are other examples.

The halide accelerators appear to function as solvents for zinc silicate at elevated temperatures and their catalytic activity can be regarded as due to removal of zinc silicate shell that forms upon the surface of particles of reacting ingredients, such as particles of zinc oxide and silica, and which, unless removed, would form a barrier between such particles, which would reduce the speed of the reaction. The halide does not enter into the constitution of the phosphor.

The catalyst both reduces the time of reaction and improves the luminous efficiency of the phosphor product. In the absence of the halide accelerator, the time required for the production of the product has been at least about 15 hours, and as long as 80 hours or more at 850° C. When using about 15 per cent of a potassium chloride accelerator, the firing period can be reduced to about 40 minutes at 850° C. The intensity of fluorescence of the ultimate product is about double the intensity of phosphors which heretofore has been obtained in the absence of an accelerator.

When the accelerator consists of an added material, such as a chloride or a fluoride of an alkali or an alkaline earth metal, it may be removed from the final product by grinding the final product and washing with water until the wash-water filtrate no longer shows presence of halides. However, it is not essential that all of the accelerator, or, indeed, any of it, should be removed from the final product. When 15 per cent of accelerator is used, the completed phosphor, even without removal of the accelerator, has its efficiency impaired only about 3 per cent by the presence of the accelerator.

The diffraction pattern of the yellow phosphor, made in accordance with my invention, is characteristic of an amorphous material, the only lines present being those characteristic of zinc oxide or of silica, whichever may be in excess. The pattern shows strong diffuse scattering, which is characteristic of the presence of an amorphous material. An increase of temperature materially above 850° C., or an undue increase of the time of reaction, or the use of an excessive amount of accelerator, tends to result in the formation of the green crystalline phosphor rather than the yellow phosphor.

What I claim as new and desire to secure by Letters Patent of the United States is:

1. The method of accelerating a chemical reaction resulting in an amorphous zinc silicate which emits yellow light when subjected to ultraviolet radiation which consists in mixing with reacting ingredients forming zinc silicate both a neutral material and about .5 to 40 per cent of an accelerator consisting of a catalytic metallic halide, and heating to a temperature of about 850° C.

2. The method of making fluorescent material which comprises heating to about 850° C. a mixture of zinc oxide and silica, a crystallization-retarding reagent, and about 0.5 to 40 per cent of a catalytic metallic halide.

3. The method of making fluorescent material which comprises heating to about 850° C. a mixture of zinc oxide and silica, a crystallization-retarding material, and about .5 to 40 per cent of alkali chloride.

4. The method of accelerating the chemical reaction resulting at about 850° C. in zinc silicate emitting yellow fluorescent light which consists in associating with the reacting ingredients a substantial quantity of a neutral ingredient, and about .5 to 40 per cent of a catalytic metallic halide and, upon completion of the reaction, removing said halide from the reacted product.

5. The method of making a yellow-fluorescent zinc silicate phosphor which consists in preparing a reaction mixture of one mol of zinc oxide, two to four mols of silica, about 0.4 to 1.25 per cent of a manganese activator, and about 15 per cent of potassium chloride, and heating said mixture to about 850° C. for about forty minutes.

GORTON R. FONDA.